May 24, 1966 C. E. BARTLEY ET AL 3,252,369
METHOD AND APPARATUS FOR LOADING SOLID PROPELLANT
INTO ROCKET CASINGS AND THE LIKE
Filed Feb. 18, 1964 8 Sheets-Sheet 5

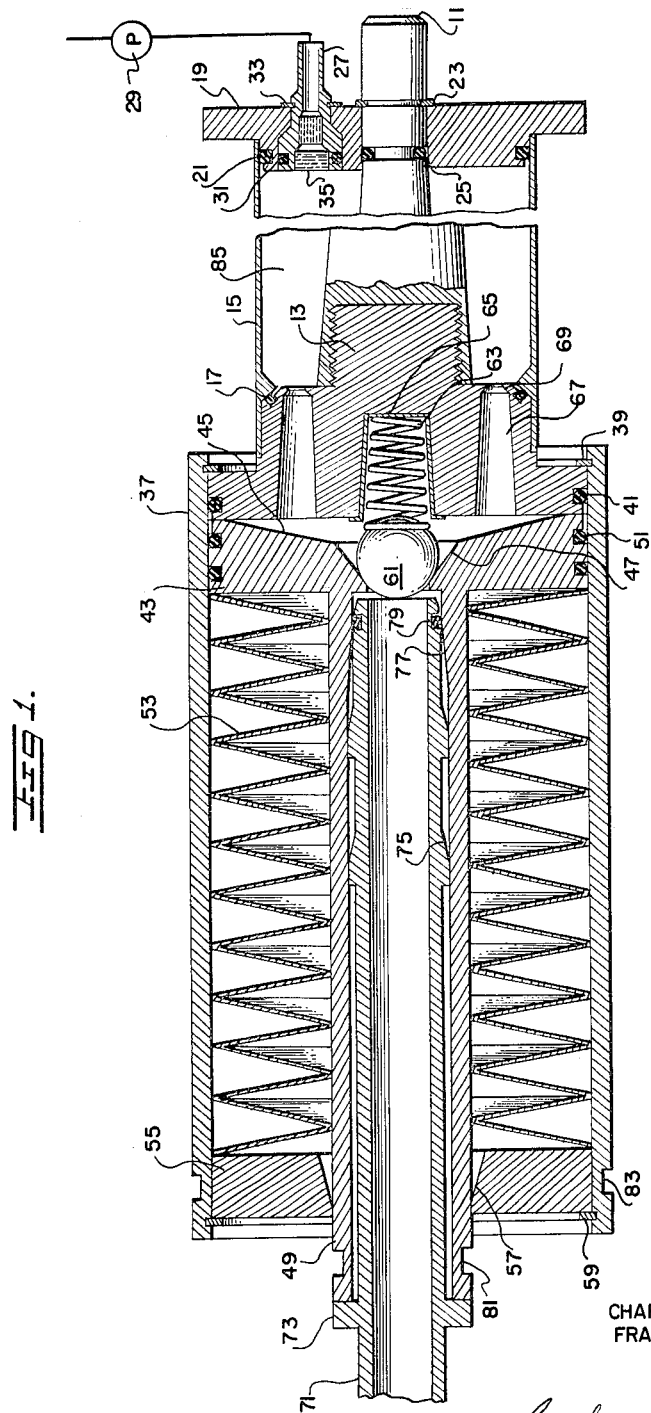

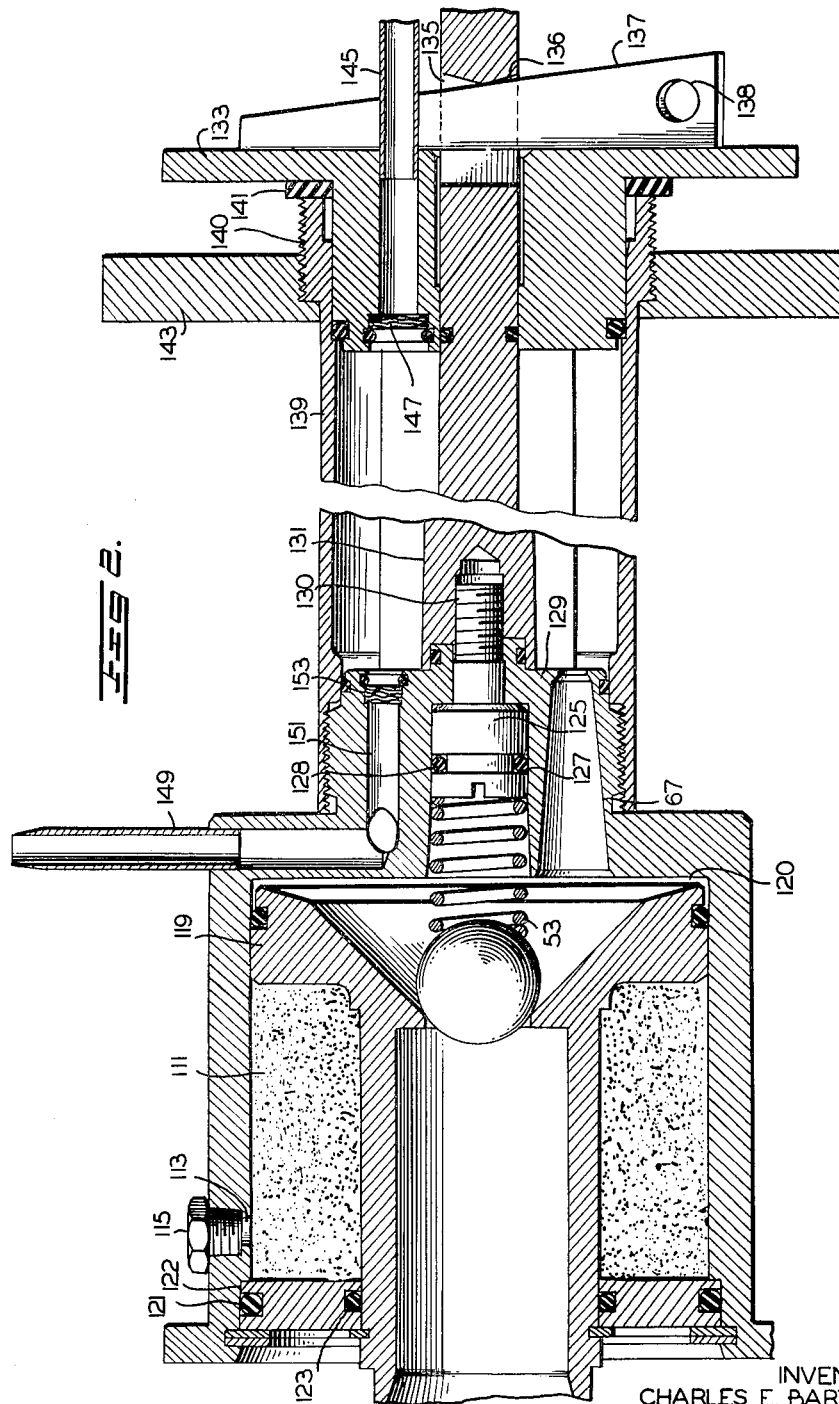

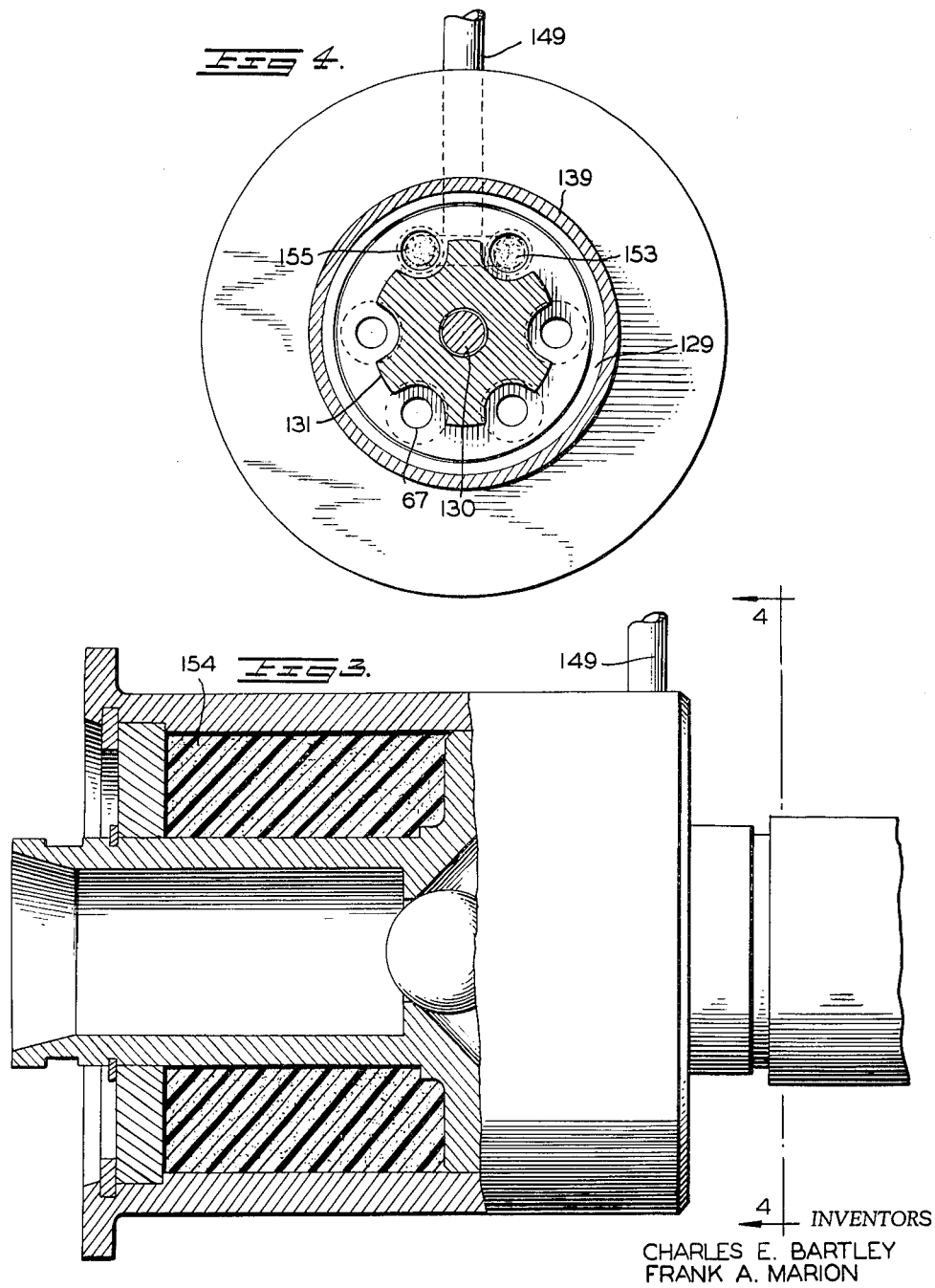

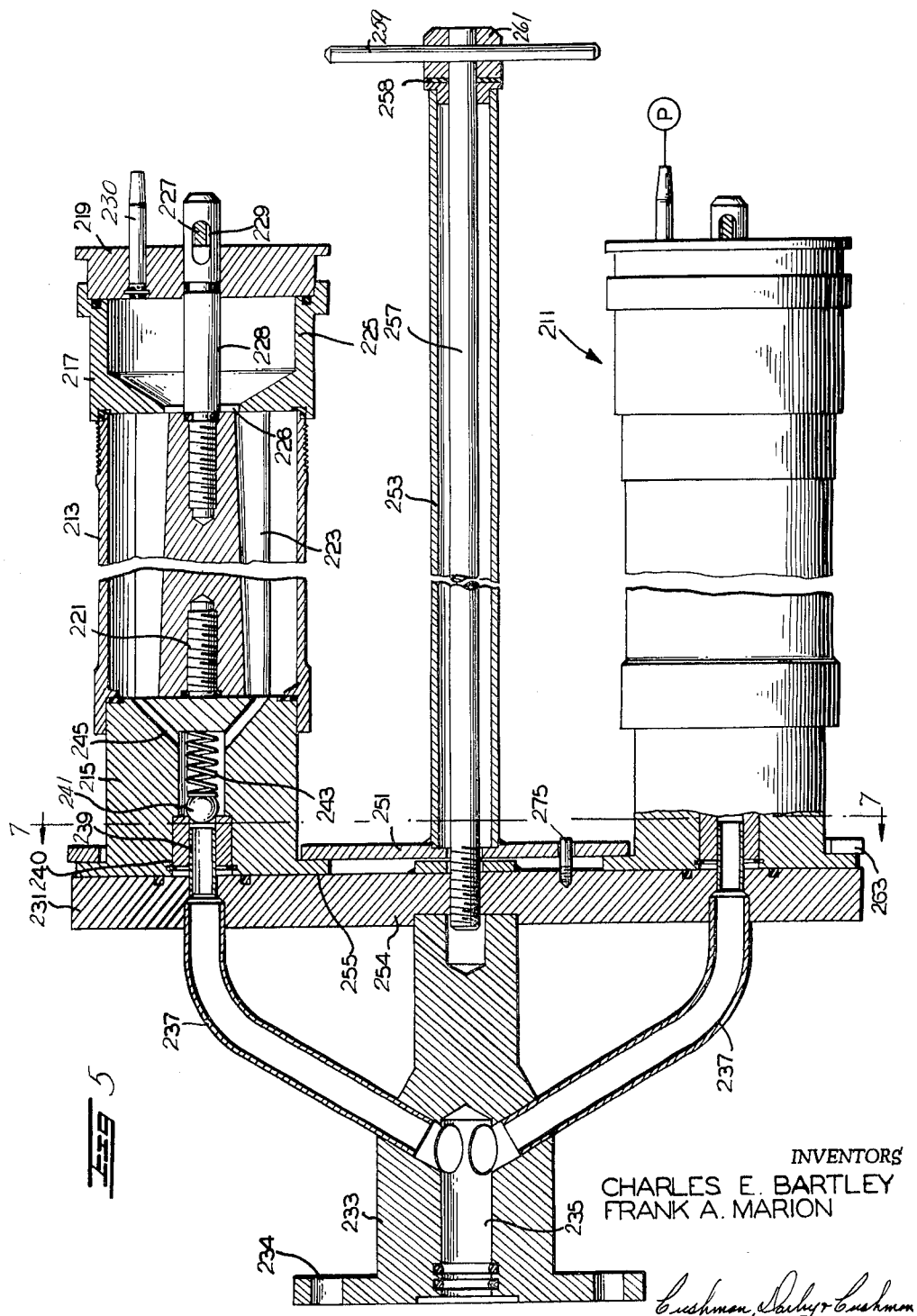

INVENTORS
CHARLES E. BARTLEY
FRANK A. MARION

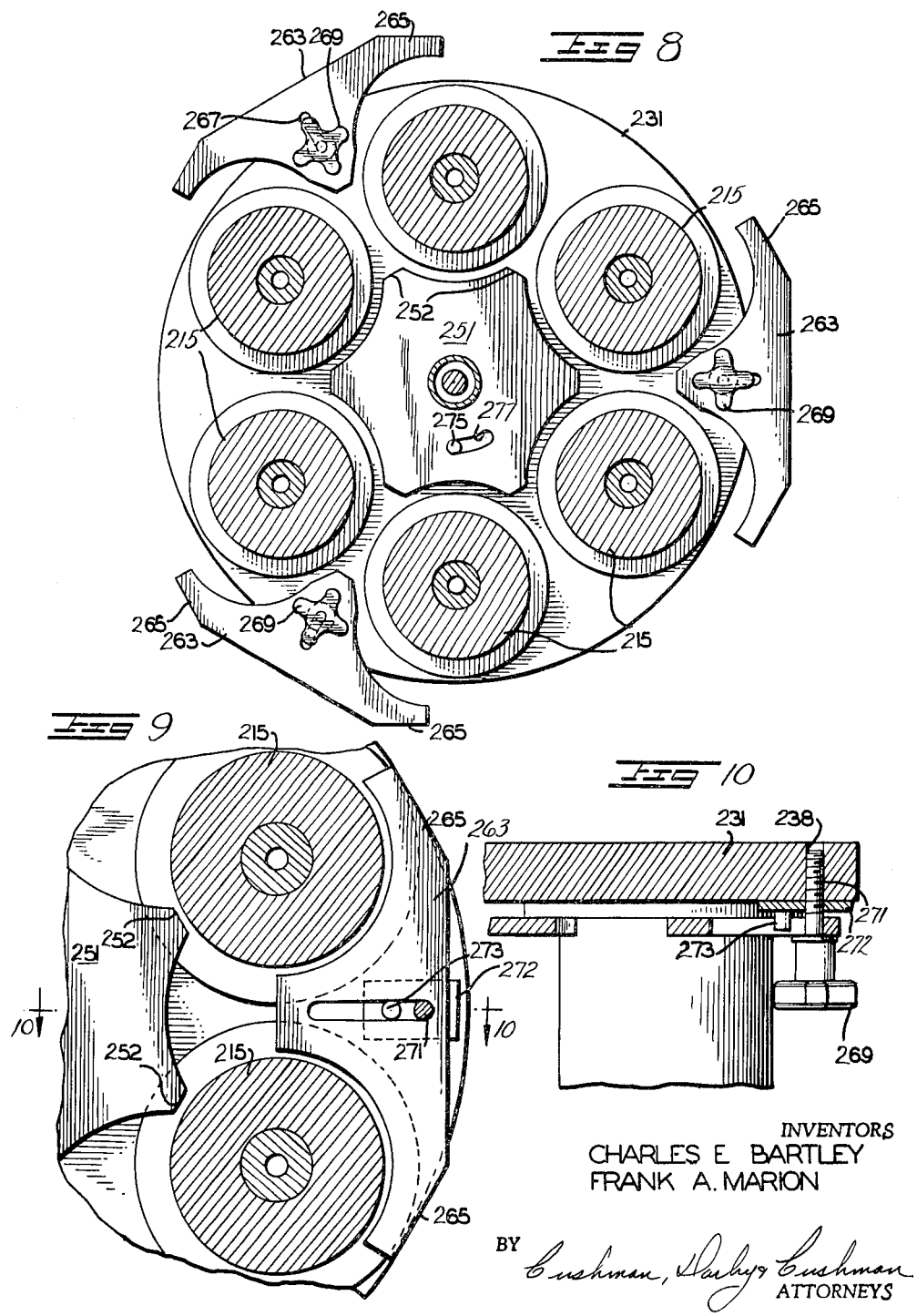

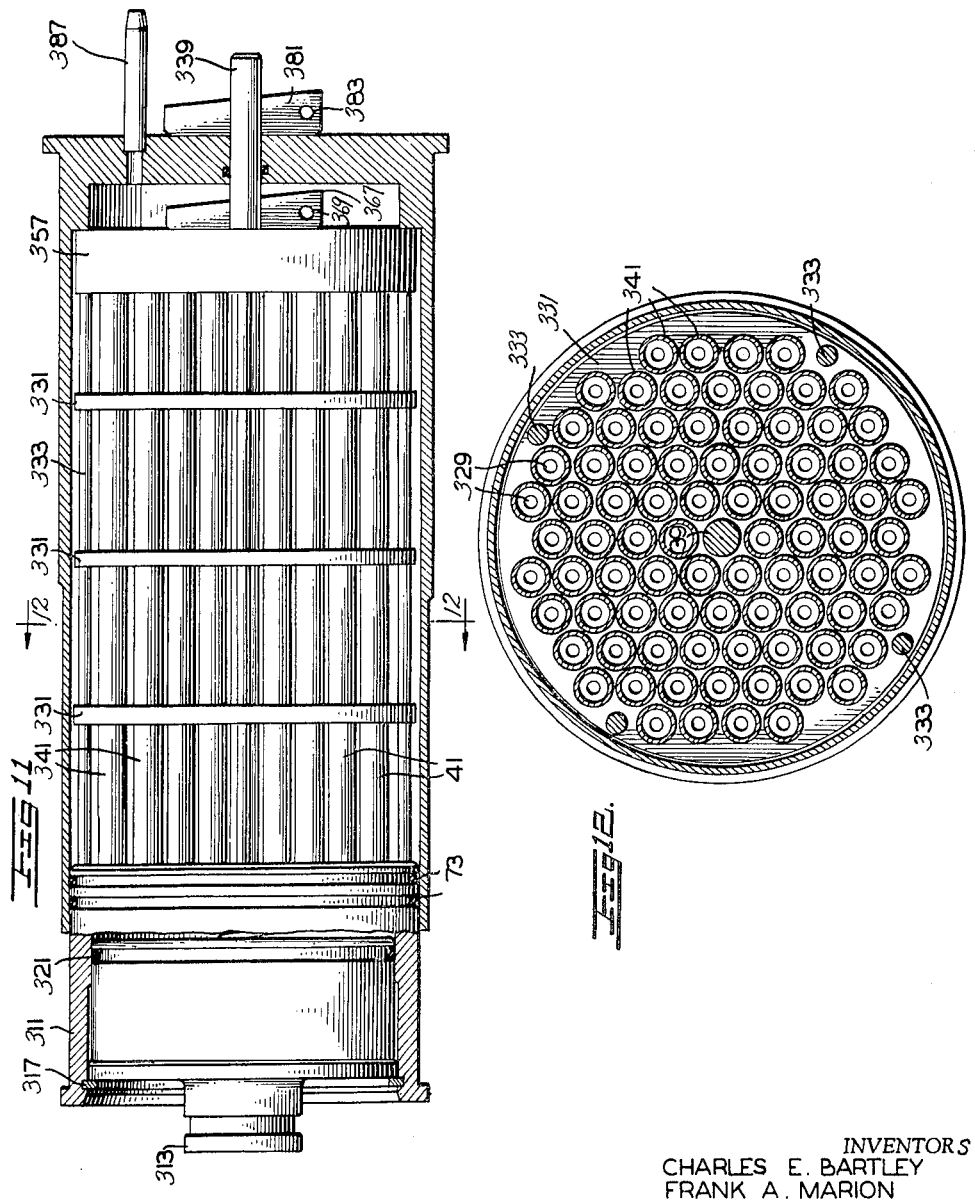

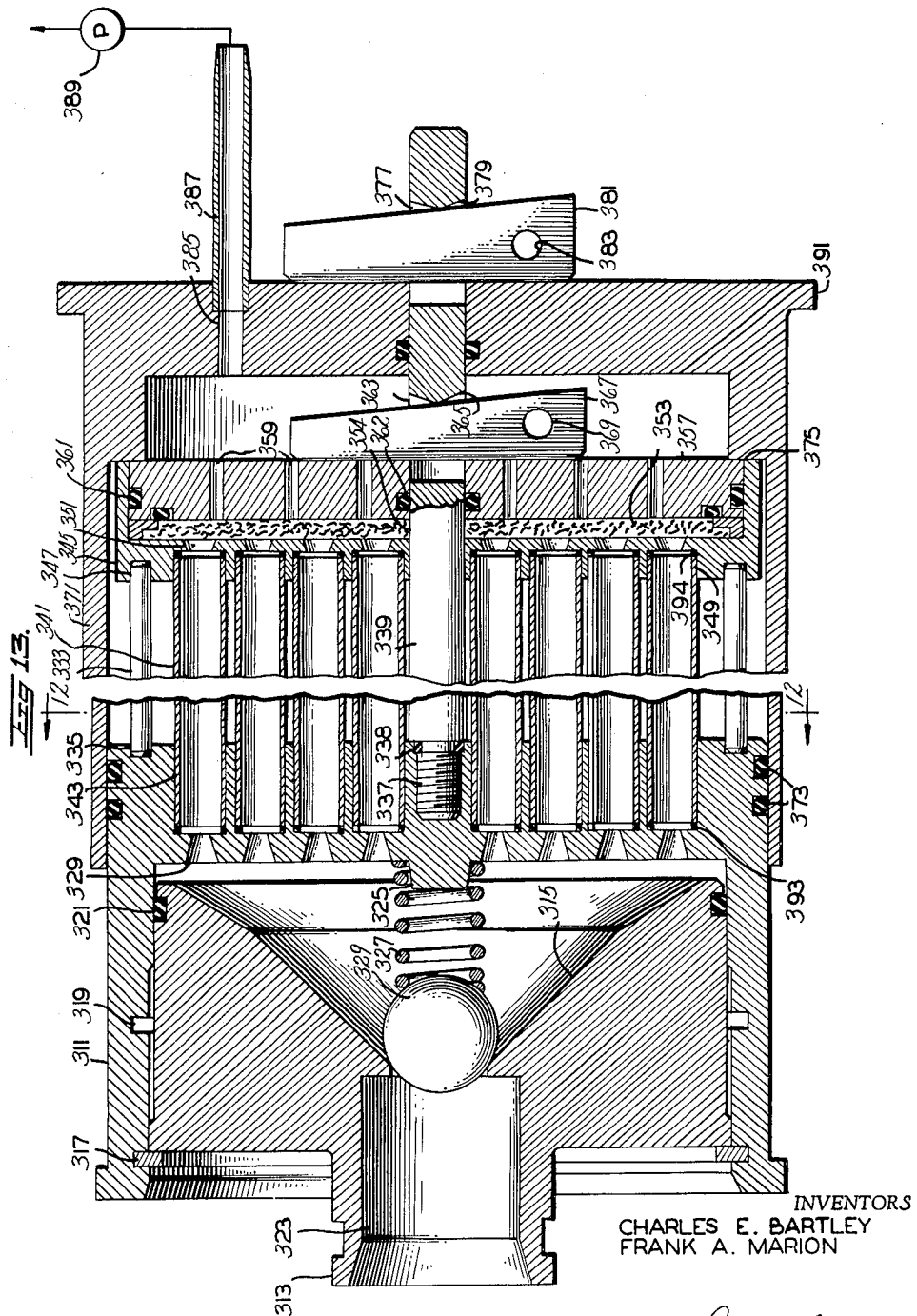

United States Patent Office 3,252,369
Patented May 24, 1966

3,252,369
METHOD AND APPARATUS FOR LOADING SOLID PROPELLANT INTO ROCKET CASINGS AND THE LIKE
Charles E. Bartley, 6520 E. Exeter Blvd., and Frank A. Marion, 6109 E. Exeter Blvd., both of Scottsdale, Ariz.
Filed Feb. 18, 1964, Ser. No. 345,704
31 Claims. (Cl. 86—20)

The present invention relates in general to a method and apparatus for force feeding propellant into a chamber and is concerned particularly with a method and apparatus for force feeding propellant into a horizontally mounted rocket motor case.

This application constitutes a continuation-in-part of our co-pending applications, Serial No. 135,040 filed August 30, 1961, now abandoned; Serial No. 135,039 filed August 30, 1961, now abandoned; and Serial No. 135,041 filed August 30, 1961, now abandoned.

Various methods of and means for loading a solid propellant directly into a rocket chamber are well known in the art. However, the present procedures being used load such propellants into the rocket chambers with the chambers in a vertical position in order that propellant consolidation may be obtained at all times. This method has numerous operational disadvantages as well as presenting apparatus which is difficult and dangerous to handle. Additionally, such devices as are now in use require that further finishing operations be accomplished after the propellant is secured within the rocket casing.

Accordingly, an object of the present invention is to provide a method and apparatus for force feeding de-aerated propellant into a horizontally mounted rocket motor chamber.

A further object of the invention is to provide a means for force feeding de-aerated propellant into a rocket chamber with the mandrel fixed in place.

A still further object of the invention is to provide a means for loading propellant into a rocket chamber under vacuum conditions.

Another object of the invention is to utilize the loading pressure of the propellant for consolidating the propellant in the rocket motor chamber.

Another object of the invention is to maintain a constant pressure on the propellant within the motor chamber during the loading and curing operation.

Still another object of the invention is to utilize the rocket motor case and mandrel as structural members for retaining the remaining apparatus used in the loading process.

Yet another object of this invention is to provide rocket loading apparatus which is easily removable from the rocket chamber after the loading and curing process has been completed.

A still further object of the invention is to provide a method and apparatus for feeding propellant into a rocket motor chamber in a manner whereby the necessity for further finishing operations in preparation of the solid propellant charge within the rocket motor is eliminated.

Another object of this invention is to provide a method and apparatus for force feeding the propellant into a rocket motor chamber which may be remotely controlled with resultant safety to personnel and property.

Another object of this invention is to provide means for simultaneously casting a plurality of rocket motor cases.

Another object of this invention is to provide apparatus for horizontally mounting a plurality of rocket motor cases securely on a base member during the loading operation.

A further object of this invention is to provide a means for simultaneously casting a plurality of rocket cases by means of a central main supply conduit having branch conduits leading therefrom to each of the rocket motor cases.

Yet another object of this invention is to provide apparatus for the casting of a plurality of rocket motor cases in a rapid, economical and safe manner.

With the advent of workable solid rocket propellant fuels a demand has been created for the use of these solid fuels in relatively small charges. These charges have many purposes and may be used for applications wherein a relatively small but substantially instantaneous force is needed, such as in ejection seats in high speed aircraft, and in catapults and the like. Since these charges are expendable and are used rather extensively, it is highly advantageous to provide apparatus for producing a number of these charges substantially simultaneously in a short period of time in order to reduce production costs and meet the ever increasing demand. However, in the past the danger involved in handling solid fuel has necessitated individual production of these charges in order to obtain optimum safety conditions during the forming, curing, handling and storage of the charges. This single operation has proven to be time consuming and expensive and, additionally, requires the utmost precautions which are involved with the operation of any known loading apparatus.

Accordingly, it is an object of this invention to provide apparatus for multiple casting of tubular inhibited propellant grains.

Still another object of this invention is to provide a safe and economical handling operation for multiple loading and curing inhibited propellant charges.

Further objects of the invention will become apparent from the following disclosure when taken in conjunction with the drawings wherein:

FIGURE 1 is a sectional view of the rocket chamber together with its associated loading apparatus of the present invention;

FIGURE 2 is a sectional view of a modified form of the loading apparatus;

FIGURE 3 is a partial view of a further modification of the invention;

FIGURE 4 is a sectional view taken along the lines 4—4 of FIGURE 3;

FIGURE 5 is a sectional elevation view of the apparatus including the main supply and branch conduits, clamping means and rocket motor cases;

FIGURE 6 is an end view looking towards the supply branch conduits;

FIGURE 7 is a sectional view taken along the lines 7—7 of FIGURE 5 with the rocket motors in place and the retaining apparatus in a clamped position;

FIGURE 8 is a view similar to FIGURE 7 with the retaining apparatus in its open or unclamped position;

FIGURE 9 is a partial view of the details as shown in FIGURE 7;

FIGURE 10 is a sectional view taken along the lines 10—10 of FIGURE 9;

FIGURE 11 is a sectional plan view of the rocket loader and associated apparatus of the present invention;

FIGURE 12 is an end view taken through the line 12—12 of FIGURE 11; and

FIGURE 13 is a partial detailed plan view of the rocket loader of FIGURE 11.

The present invention is particularly adapted for use with the solid propellant produced in accordance with our co-pending application Serial No. 3,472, filed January 15, 1960, now abandoned, entitled "Process and Apparatus for Preparing Solid Propellants."

Turning now to the drawings and particularly FIGURE 1, the rocket motor case 15 is assembled to the mandrel 11 and to a head plate 19 by means of a snap ring 23 or the like and suitable sealing means such as O-rings 21 or the like are provided for sealing the assembly. It should be noted that the rocket case 15 can be of any size desirable in practicing this invention, and the mandrel may be of any desired shape. The mandrel 11 is secured to a mandrel base 13 by means of a matching male-female threaded connection or the like and the mandrel base may be sealed against the rocket motor chamber 15 by a sealing means such as O-ring 17. A vacuum line connection and vacuum valve assembly 27 may be connected to a vacuum pump 29 in order to remove the air from the rocket chamber. The vacuum valve assembly is secured to the head plate 19 by means of a snap ring 33 and is sealed thereto by means of O-ring 31. Additionally, the vacuum valve assembly 27 contains air permeable filter materials 35 for purposes which will become apparent as the description proceeds.

A reservoir cylinder 37 is secured at one end thereof about the circumference of the mandrel base 13 by means of a snap ring 39 with sealing being provided by O-ring 41. A clearance is maintained between all metal parts directly associated with the propellant. This prevents the possibility of propellant being caught between two metal surfaces and creating unnecessary friction.

A reservoir piston 43, having a conical face 45, is mounted in a floating condition within the reservoir cylinder 37 with sealing being provided between the reservoir and piston by O-rings 51. A hollow piston shaft 49 extends rearwardly from the reservoir piston 43 and an opening is provided through the piston by means of a conical port 47.

Reservoir feed springs 53 surround the hollow piston shaft 49 and are contained within the reservoir cylinder 37. The springs 53 are of a constant pressure type such as Belleville, helical, fiber or the like and are designed so as to preload the piston 43 with a force which is approximately equal to the casting pressure to be used, whereby the spring will apply a minium force increase if the piston 43 is displaced due to the pressure in the reservoir area created by the piston and the mandrel base. An end plate 55 is slidably mounted over the hollow piston shaft 49 and fits snugly within the reservoir cylinder 37, thereby exerting a pressure upon springs 53 and centering the piston shaft 49 within cylinder 37. In order to prevent binding due to the very close tolerances used, a chamfer 57 is provided in the opening through the end plate 55. End plate 55 is held in place against the force of the springs 53 by means of snap ring 59.

A ball 61 of hard rubber, plastic or non-metallic material is held against the conical port 47 by means of a spring 63 contained in a cup 65 in the mandrel base. The ball seals the conical port until the spring pressure is overcome by pressure exerted by the propellant. Valve spring 63 is preloaded to seal the port 47 against one atmosphere pressure, with the spring constant giving a minimal resisting force when the ball 61 is deflected. A plurality of inlet ports 67 extend through the mandrel base and are tapered at their forward ends 69. When the spring is depressed by the propellant being forced into the rocket motor chamber, the ball 61 is moved away from port 47 an amount which provides an annular space thereabout equal to the area of the inlet ports.

A casting probe 71 is inserted into the hollow piston shaft 49 until the shoulder 73 on the probe abuts the end of the piston shaft 49. Guide lands 75 are provided on the outer surface of the casting probe 71 in order to center the probe within the piston. Additionally, the forward inner circumference of the hollow piston 49 decreases so as to provide a sealing means between the probe and the piston by O-rings 79. The circumferential notches 81 and 83 are provided for a jig and tooling assembly (not shown) for holding the apparatus. This jig also lockes the probe 71 against the piston 49 by means of the circumferential slot 81 and the shoulder 73 in order to prevent the probe from backing out of the piston due to the pressure of the propellant being fed to the rocket motor chamber.

The loading operation and the method of accomplishing same will now be described. The air within the rocket motor chamber 15 is removed by a vacuum pump 29 through the vacuum valve 27 prior to the injection of the propellant through the probe 71. During the vacuum de-aeration process the propellant injection into the motor and tooling assembly is sealed against external air pressure by the ball seal which has a force exerted against it by the preloaded spring 63. The preload force of the spring is slightly greater than the force exerted on the exposed face of the ball by one atmosphere external pressure.

The rocket motor case and tooling assembly is held in a jig fixture (not shown) for restraining the tooling assembly at the points 81 and 83 on the probe and cylinder sections.

The loading probe 71, which is connected to the force feeding casting system of the above mentioned application, is inserted into the reservoir piston cylinder 49 and aligned and guided by the guide lands 75 on the casting probe 71. The loading probe is inserted into the piston until the probe shoulder 73 engages the end of the reservoir cylinder 49. When the loading probe reaches this position, its extreme end is sealed against the piston cylinder in a position adjacent to the ball seal 61 of the injection valve assembly. An external lock (not shown) is provided to hold the probe shoulder 73 in static position with relation to the grooves 81 and 83. The lock prevents the casting probe from retracting due to fluid pressures during the loading operation. The pressurized propellant is then fed through the casting probe and exerts a force on the ball seal 61 which overcomes the preload on the spring 63 and forces the ball seal and the spring to move away from the ball seat 47 and creates an annular passage between the ball seat and the ball seat cone.

The reservoir piston contour 45 allows the propellant to spread across the entire piston area which allows the propellant to flow through the tapered inlet ports 69, through the mandrel base 13 and into the propellant cavity 85. Simultaneously, de-aeration of the propellant cavity continues through the vacuum valve assembly 27 in order to prevent compression of the very low pressure air in the propellant cavity as the cavity becomes filled with the propellant.

The propellant is fed through the propellant cavity within the rocket motor chamber 15 and around the mandrel 11 until the entire propellant cavity is filled and the propellant is consolidated by the pressure in the force feed system. At this time the propellant under pressure seals the vacuum valve assembly 27 by compression of the filter materials 35 within the vacuum valve assembly.

When the propellant cavity is filled, the ball seal 61 reaches equilibrium pressurization, due to the static condition of the pressurizing propellant fluid, and is moved against its sealing cone 47 by the force of spring 63 so as to check the flow of propellant back out of the assembly when the casting probe is removed and to seal the propellant within the rocket motor chamber and assembly until it is cured into a solid state.

After the loading of the propellant chamber, the loading probe 71 is removed and the propellant is then cured.

During the casting operation the temperature of the propellant may range from an uncontrolled ambient temperature to an elevated temperature if the propellant mixture is heated prior to casting. The curing temperature is usually substantially higher than the propellant casting temperature and, in addition, composite solid propellants generally produce an exotherm temperature rise caused by chemical reactions during the propellant cure. This difference between casting temperature and curing temperature can be measured and can be controlled if necessary. The exotherm rise during curing can also be measured. Knowing the temperature coefficient of expansion for the specific propellant formula, which also can be measured experimentally, the volume increase of the propellant initially loaded into the system can be calculated for a maximum temperature differential and, thereby, the propellant reservoir and the spring loading system 53 can be designed to accommodate this increase in propellant volume without a significant increase in propellant cure pressure above the propellant casting pressure.

Normally, the spring loading system 53 on the reservoir piston is preloaded to a force equivalent to the propellant casting pressure acting upon the surface 45 of the reservoir piston 43. With spring design having a spring constant giving a low deflection force as the reservoir piston is displaced by the flow of the propellant into the reservoir due to expansion from temperature rise, the curing pressure can be controlled to a pressure range slightly greater than the propellant casting pressure. However, if a propellant curing pressure lower than the propellant casting pressure is desired, the preload force of the spring system on the reservoir piston 43 can be controlled to the desired curing pressure range, due to the fact that the piston is held in a rigid position by external tooling (not shown) during the propellant loading operation.

With the normal differential between propellant loading temperature and propellant curing temperature, an expansion of propellant due to the differential of temperature is in the order of 1% to 3% of the initial propellant volume. As the propellant cures, its volume decreases slightly due to shrinkage which occurs as a result of the curing process. The propellant volume shrinkage can also be calculated and measured experimentally and this has been determined, for composite solid propellants in current use, to be in the order of ½% to 1½% of the initial propellant volume and may be determined with reasonable accuracy for a given propellant formulation and a given cure condition.

Inasmuch as the increase in propellant volume due to the increase in temperature from casting temperature to curing temperature is substantially greater than the decrease in propellant volume due to curing shrinkage at the curing temperature, a surplus of propellant remains in the reservoir created by the piston and the mandrel base until the propellant curing shrinkage is complete. As the shrinkage occurs within the rocket motor propellant charge, the reserve propellant in the reservoir is forced into the propellant charge volume by the spring force exerted against the reservoir piston by the constant pressure springs 53. The propellant volume within the chamber is thus maintained at the maximum requirement, and the propellant is maintained under positive cure pressure until it is cured into a solid state. One advantage obtained from the present propellant reservoir feed system is that a minimum of the propellant is wasted due to the fact that there is, in essence, no initial reservoir volume of propellant and the initial volume of propellant in the rocket motor charge area must be maintained in order to achieve complete consolidation of the propellant when it is cast into the propellant charge area.

Another advantage obtained is that the flotation piston in the reservoir allows growth of the propellant volume with increase of the propellant temperature which circumvents the problem of extreme pressures that would be created with a rigidly fixed volume system.

An additional advantage is that the constant pressure piston in the reservoir insures continued consolidation of propellant by replenishment of propellant volume as the subsequent curing shrinkage occurs.

After the propellant has been completely cured, the rocket motor and adjacent tooling assembly are transported to a tooling area where the rocket motor and tooling assembly may be set in position in holding jigs (not shown) on a remotely operated tooling removal machine.

When the rocket motor and tooling assembly have been positioned in the above-mentioned fixtures on the tooling removal machine, the snap ring 23 which holds the head plate 19 by a connection to the mandrel 11 can be removed manually. The head cap 19 is then removed and the core configuration mandrel and reservoir assembly are extracted from the rocket motor chamber 15. As the assembly, which includes the reservoir cylinder 37 and piston 43, is removed from the rocket motor chamber 15, the propellant inlet ports 67 (which are comparable to casting risers) shear the propellant at the face of the propellant charge due to the tapered configuration of the inlet port. The result of this is that the propellant charge is completely finished and requires no further trimming or finishing operations. After the mandrel and reservoir tooling assembly have been removed from the rocket motor casing 15 the reservoir assembly is set up in the tooling fixture (not shown) which holds the reservoir cylinder at the grooves 81 and 83 while a force is exerted against the end plate 55 allowing the removal of the snap ring 59 connecting these two parts. The force against the end plate 55 is gradually decreased allowing it to move out of the reservoir cylinder 37 and allowing the preload springs 53 to fully extend themselves and relieve the preload. The end plate 55 and springs 53 are then removed from the system and the reservoir piston cylinder 49 is then removed from the piston assembly away from the mandrel base 13. The piston base 45 is not surfaced with a propellant release agent, but all other parts of the tooling in contact with the propellant are surfaced by a release agent such as a Teflon coating or the like. Therefore, as the piston 43 is pulled away from the mandrel base 13, the propellant which was cured in the reservoir cavity has adhered to the piston face 45 and pulls away from the mandrel base and out of the tapered inlet ports 67 as one cohesive unit. Similarly, the ball seal 61, spring 63 and spring cup 65 are pulled away with the propellant, leaving the mandrel base and inlet ports free of propellant contamination and ready for reuse. A rod may then be inserted within the piston cylinder which, when acting as a push rod, will bear on the ball 61 seated in the aperture 47 in the piston 43 and, by exertion of a force against the ball seat, will cause the majority of the propellant which has adhered to the piston face to be sheared off, leaving a small residue of propellant on the piston face that can easily be removed by cleaning solvents.

One of the obvious advantages of this tooling removal and tooling cleaning system is that the removal of the tooling from the rocket motor case is adaptable to a remote automated operation avoiding exposure of personnel to any potential hazard.

Another advantage is that the method described above concludes its operation and effectively produces a solid propellant charge that requires no additional finishing operations.

An additional advantage is that this tooling cleanup system may be accomplished with greater rapidity, thus assuring maximum effective utilization of the tooling which reduces the supporting cost of tooling for the given operation.

A modification of the apparatus disclosed above is shown in FIGURE 2 wherein inert gas 111 is used rather than the constant pressure spring 53 of the device as shown in FIGURE 1. This inert gas, which may be nitrogen, will provide, within limits, the same constant pressure on the piston 119 as is provided by the constant pressure spring. This gas may be pumped into the enclosure through an opening 113 in the cylinder and a gastight plug 115 may be used to seal off the opening and provide a means for supplementing the gas within the enclosure. Piston 119 is shown, FIGURE 2, in a position which it may assume due to pressure from the propellant on the conical face of the piston which causes it to move away from its seat and provide a reservoir 120 between the ball seal and the propellant inlet 67. Seals 121 and 123 are provided in order to prevent any escape of gas through and past the end plate 122.

This embodiment also provides a modification of a means for securing the mandrel to the mandrel base. A bolt type member 125, having a recess 127 in the head thereof in which the spring member 128 is secured, passes through the mandrel base 129 with the threaded portion 130 of the bolt extending beyond the mandrel base. The mandrel 131 is then secured to the mandrel base by being threaded upon the portion 130 of the bolt 125.

Additionally, in order to provide a simplified means of dismounting the entire apparatus after the propellant has been cured, the forward portion of the mandrel has a slot 135 passing therethrough with a cammed face portion 136 extending beyond the end plate 133. A tapered bar 137 is driven upwardly through the slot 135 and bears against the cam surface 136, thus forcing the headplate securely inwardly against the rocket casing 139, with a sealing ring 141 placed between the headplate and the rocket casing. An aperture 138 is provided in the lower portion of the tapered bar 137 in order to provide an easy method of removal of the tapered bar after the propellant has been cured.

A stripper ring 143 may be mounted on a threaded portion 140 of the rocket casing 139 in order to provide a means for mounting or holding the rocket case while assembling and disassembling the loading apparatus.

A vacuum tube 145, similar to the vacuum tube of FIGURE 1, is provided in this embodiment and is connected with a pumping means such as shown in FIGURE 1. Additionally, a second vacuum tube 149 is provided in the mandrel base and is associated with vent passages 153, 155, also in the mandrel base. This additional venting means is provided in order that air may pass outwardly at both ends of the rocket casing as it is being loaded with propellant. The vent 149 may also be connected to the vacuum pump 29 shown in FIGURE 1. A filter material 153 is provided in the vent pasages so that when the fuel reaches the upper portions of the rocket and has forced out all of the air, the fuel will subsequently seal the filters as described in connection with the loading procedure discussed above.

FIGURE 3 is a partial sectional view of another means for obtaining the desirable constant pressure provided by the constant pressure spring 53 of FIGURE 1 and the inert gas of FIGURE 2. In FIGURE 3 a resilient or elastic material which may be a foam plastic such as rigid polyurethane is used. Under compression it has been found that such material provides a substantially constant pressure on the piston head as required in the above-described method of loading.

FIGURE 4 is a sectional view taken along lines 3—3 of FIGURE 3 and illustrates the loading and air vents in the mandrel base as shown in the embodiments of FIGURES 2 and 3. The vent 149 is connected to the air passages which are filled with the filter material 153 and 155. In the embodiment illustrated, four inlet ports 67 are provided and are spaced within the mandrel base 12 so as to accommodate the particular configuration of the mandrel 131.

Referring now to FIGURES 5–10 of the drawings, there is shown in FIGURE 5 a plurality of rocket motor enclosures 211 of the type specifically described above in connection with FIGURES 1–3. Each enclosure 211 includes an outer casing member 213 secured to a housing 215 at one end thereof and provided with an end cap member 217 and an end plate 219 at the other end thereof. The housing 215 is provided with a threaded extension member 221 upon which may be mounted a mandrel 223, shown here as having a star configuration. The end caps 217 are provided with a recessed area 225 and a central opening 226 through which the fluent propellant may pass when the casing 213 becomes completely filled. The mandrel assembly is secured within the housing and through the end plate by means of a rod 228 which may be threaded to the mandrel and which passes through end plate 219. A taper bar 227 is wedged within a slot 229 in the rod 228 in order to provide the necessary holding pressure against the end plate. Additionally, a vacuum tube 230 is provided in order that the entire assembly may be evacuated by means of a vacuum pump or the like prior to and during the filling operation. For further details of the individual rocket motor casings, reference is made to FIGURES 1–3.

A base plate member 231 is secured to a supporting member 233 having a main supply conduit 235 therein. Branch supply conduits 237 lead from the main supply conduit 235 up to and through the base plate 231 and terminate in a probe 239 which extends into the housing 215. A branch supply conduit is provided for each of the rocket motor cases 213 mounted about the base plate 231. A ball seal 241 is spring biased against the opening in the housing by means of the spring 243. The spring is designed so that the bias may be overcome by the pressure of the propellant passing through the branch conduits 237 and thus allowing the fluent propellant to pass through the channels 245 within the housing 215 and into the motor casing 213. As mentioned above, the chamber is evacuated by means of the vacuum tube 230 and the pump prior to and during this filling operation and the evacuation continues until the propellant passes through the motor casing and into the chamber 225. This evacuation procedure insures a complete filling of the motor casing and the elimination of any possible air pockets in the final rocket motor.

The housings 215, to which the rocket motor enclosures 211 are secured, are removably clamped against the base plate 231 by means of a rotatable spider 251 centrally located within the cluster of rocket motor chambers. The legs of the spider 251 are slightly bevelled and when rotated bear against the flanged portion 255 of the housing 215, thereby clamping the housing against the base plate 231. A cylindrical extension 253 is provided integrally with the spider 251 and the final clamping of the spider member may be provided by means of a rod 257 threadably inserted within the base plate 231 and having a handle 259 embedded in the end cap 261 surrounding the shaft 257. The movment of the spider 251 is limited by means of a pin 275 extending from the housing 231 and passing through an arcuate slot 277 in the spider, the details of which will become evident as the description of the apparatus proceeds.

Referring now to FIGURES 7–10, the rocket cases are secured to the base plate 231 by a further clamping means which is comprised of a yoke member 263 having dual scalloped faces which, when in the clamped position, fit about the housing 215 and are in clamping engagement with the flange portion 255 of the housings. The yoke member 263 is slidably mounted on the base 231 by means of a pin 273 extending from a spacer 272, which is integral with the base plate member 231, and a matching slot 267 in the yoke which passes over the pin member. A knurled knob 269 having a shaft 270 is threadably secured within the opening 238 of the base plate 231. Accordingly, the yoke members 263 may be slidably moved to the clamping position shown in FIGURE 7 and the knurled knob 269 is then tightened in order to provide the clamping pressure.

FIGURE 7 ilustrates the apparatus in its secured position with the spider 251 rotated to its extreme clockwise position, as limited by the pin 275 and slot member 277, so that the legs 252 of the spider are engaged in a clamping position against the flange 255 of the housing 215. The additional clamping force is provided by the yoke members 263 which are shown clamped against the flanges thus providing a stable and secure force clamping the housing 215 against the base of the plate 231.

FIGURE 8 illustrates the members in their unclamped position with the spider 251 rotated to its extreme counterclockwise position and the yokes 263 extended to their outer position whereby the housings may be removed from the base plate 231.

In assembling the apparatus the supporting structure 233 is mounted by means of bolts or the like passing through the bore holes 234 to apparatus (not shown) containing the probe of the above disclosed application which fits within the main supply channel 235 in a sealed fashion. The housings 215 are then fitted over the probes 239 of each branch conduit 237. The housings alone are relatively light in weight so as to permit the temporary support thereof by the extending probe members 239. The spider 251 is then secured to the end plate 231 by means of the shaft 257 which is rotated into a position whereby it exerts its clamping force against the flange 255. The entire spider assembly is then tightly clamped by rotation of the handle 259. The yoke member 263 are slidably positioned over the flange of the housing and tightly clamped by rotating the knurled knob 269.

The housing is now ready to receive the motor casing 213 which is slidably secured thereto with the end cap 217 secured to the other end of the housing which includes the inserted mandrel 223. The end plate 219 is then secured to the end cap by means of the taper bar passing through the slot 229 in the end of the rod extension 228 connected to the mandrel. The vacuum pump is connected to the vacuum tube and the casting process is ready to begin.

The actual filling process is preceded by the evacuation of the chamber by means of the pump and vacuum tube, and this evacuation continues until the tube is blocked by the propellant which occurs after the chamber of the rocket motor is filled and the fluent propellant has passed into the chamber within the end cap 217. Reference is made to the above-identified figures for a description of one means for blocking the vacuum tube by means of the fluent propellant. The pressure differential between the vacuum created by the pump and the input pressure propellant through the main and branch conduits overcomes the bias of spring 243, forcing the ball seal 241 inwardly and thus allowing the propellant to pass through the passages 245 and into the main rocket chamber 213. When the chamber is filled, and the vacuum tube is blocked by the propellant, the pressure equalizes and the force of the spring 243 biases the ball 241 against the opening preventing further flow of the propellant through the housing. Since the propellant pressure is equal in all branch conduits and the vacuum is equal on all vacuum tubes, each motor is loaded substantially simultaneously, thus reducing the loading time to a minimum. It should be noted, however, that although all of the motors are loaded substantially simultaneously, absolute simultaneous completion of the filling operation is not required. Any of the motors could be completely filled with the filling process continuing in the other motors since final pressurization and consolidation of the propellant occurs after all motors are completely filled.

After the completion of the loading process, the rocket propellant within the cases is cured in any desired manner and the above steps are reversed in disassembling the apparatus.

It will now be obvious that modifications may be made in the apparatus as described hereinabove and such description is intended to be illustrative of the method and apparatus employed in the present invention. Any number of cases may be loaded simultaneously depending upon the size of the structure and the desired ease and safety in the handling procedure. The apparatus as described herein, which includes the simultaneous loading of six rocket motor cases with the equipment as shown, has proven to be a highly satisfactory embodiment of the invention in actual operation.

Referring now to FIGURES 11–13 of the drawings, there is disclosed a housing 311 closed at one end thereof with a piston 313 slidably enclosed within the housing. The piston has a conical base 315 and is prevented from moving outwardly from said housing by O-ring 317. A sliding seal 319 is located centrally about said piston between the piston and the housing and an O-ring 321 seals the piston within the enclosure. A propellant supply passage 323 is provided centrally within the housing and a circular ball member 329 is maintained against the opening in the conical base 315 by means of a spring 327 which may be secured to the housing over a projection 325 therein. The housing and cylinder as shown in FIGURE 11 are substantially identical to that shown in FIGURES 1–3.

A plurality of tapered ports 329 are drilled or cast through the closed end of the housing 311 in order to provide an access for the propellant. A structure comprising a plurality of parallel circular plates 331 mounted on and supported by a plurality of circumferentially spaced rods is removably inserted in recesses 335 in the outer face of the housing 311 in order to provide a means of supporting one end of the rods 333. Although any desired number of rods may be used, proper support is provided by the four equally spaced rods and recesses illustrated in the drawings. Additionally, an internally threaded bore hole is provided in the center of the outer face of the housing 311 for purposes which will become obvious as the description proceeds.

Each of the spacer plates 331 is provided with a plurality of bore holes, which are equal in number to the ports in the housing 311 and aligned therewith. An additional bore hole is provided centrally in each of the spacer plates through which a tie rod 339 passes. The tie rod is secured within a threaded bore hole 337 in the outer face of the housing and thus provides additional support for the spacer plates. As shown, the threaded connection between the tie rod and the bore hole 337 is preferably sealed, as by an O-ring 338.

Tubular members 341 pass through the bore holes and are supported by the spacer plates 331. At one end thereof, each of the members 341 is received within a recess 343 formed in the housing 311 and is in contact with one of the ports 329 in the face of the housing 311 and sealed against the outer face of the housing by means of O-rings 393 so as to provide a continuous passage for the propellant. An end plate 345, which is fixedly secured to the other end of the rods 333, as indicated at 347, has a plurality of exit ports 351 passing therethrough. The exit ports 351 are equal in number to the inlet ports 329 and are aligned therewith when rods 333 are in place in order that the other end of the tubular members may be engaged within the recesses 349 and disposed in contact with the O-rings 394 within the recesses 349 adjacent the exit ports.

The end plate 345 is provided with a central bore hole through which the tie rod passes and additionally has a circumferential portion 375 extending from the outer face thereof in order to provide a recess for a circular air permeable material 353 which also passes over the tie rod 339. Any material may be used which is air permeable so long as it prevents the escape of propellant beyond the exit ports 351. This result occurs due to the fact that, while the material allows air to pass therethrough, the propellant upon reaching the material 353 will tend to mat this material thus blocking the exit ports 351. A retainer plate 357 having exhaust ports 359 is provided in order to hold the material 353 firmly against the exit ports 351. As shown, the retainer plate 357 is preferably sealed within the recess provided by the circumferential portion 375, as by an O-ring 361.

The tie rod 339 also passes through the retainer plate 357 and is sealed with respect thereto, as by an O-ring 362. Formed in the portion of the tie rod adjacent the retainer plate is an opening 363 having an inner cam surface 365 adapted to be engaged by a taper bar 367 having an aperture 369 therein. The taper bar 367 provides a positive holding force against the retainer plate when driven through the opening 363 in tie rod 339 until it bears against the camming surface.

The entire assembly is contained within a chamber 371 which passes over the housing 311 and is sealed against housing 311 by means of an O-ring 373 in order to provide an airtight assembly. The tie rod 339 passes through the outer end 391 of the chamber and a sealing O-ring maintains the airtight condition. Tie rod 339 is adapted at its outer end to receive a second taper bar 381 which bears against a cam surface 379 formed in an opening 377 in a manner similar to the engagement of the taper bar 367 against cam surface 365. An opening 383, similar to the opening 369 is formed in the taper bar 367. Taper bar 381 provides a positive force against the outer face of the chamber and retains the assembly intact regardless of the pressure created within the airtight chamber. A vacuum tube 387 is connected to an orifice 385 which passes through the outer face of the chamber in order that the chamber may be evacuated by means such as a vacuum pump 389.

The loader is assembled in the following manner. The filter 353 and the filter holder 354 are inserted into the recess in the end plate 345. The tubular members 341 are then passed through the bore holes in the spacer plates 331 and into the recesses 349 of the plate 345 until they bear against the sealing rings within the exit ports. The retainer plate 357 is then fitted within the recess in the end plate 345 in abutting relation with the filter 353. Supporting rods 333 are then aligned with their free ends matching the recesses 335 in the outer surface of the housing 331.

The tie rod 339 is passed centrally through the basic assembly and is secured within the threaded bore hole 337 of the housing 311 and the taper bar 367 is driven into the position shown in the drawing. The outer chamber 371 is then passed over the assembly and about the housing 311 and into contact with the associated O-ring seals 373. The second taper bar 381 is then driven into position against the cam face of the tie bar and the assembly is connected to the evacuating pump 389. The passage 323 is then mated with the probe of the above mentioned figures and the casting procedure is ready to begin.

The propellant under pressure enters the passageway 323 and due to the designed tension of spring 327 forces the ball seal 329 away from the opening within the conical base 315 of the cylinder. This conical base is provided in order that the propellant will pass outwardly about the ball seal and along the conical base thus assuring that substantially equal portions of propellant will enter into the inlet ports 329 and pass into the tubular members 341. Since the tubular members are evacuated by pump 389 prior to the operation and during the casting, the propellant is forced into the tubular members by the differential pressure existing between the casting pressure of the propellant and the vacuum created by the pumping means. Additionally, the evacuation of the tubular members assures that no air pockets, will appear within the propellant or between the propellant and the tubular members.

When the propellant has filled the tubular members and has reached the air permeable material 353 adjacent to the exit ports 351, it will block the exit ports by matting the air permeable material and the pressure differential is reduced and spring 327 forces the ball against the opening in the conical base of the piston thereby stopping the flow of the propellant. As described in the above mentioned application the constant pressure means forces the piston 313 to maintain a steady pressure on the propellant while being movable to accommodate any excess propellant remaining at the face of the inlet ports when the loading has been completed. The piston is shown in this position in the drawings. After the casting procedure has been completed the entire inner assembly may be removed from the outer chamber and cured in a single unit. After the curing procedure has been completed, the tubular members are removed and may be cut to any desired length. Additionally, they may be centrally bored in order to receive an igniter.

The tubular members 341 are rigid and are of an inhibitor material such as non-burning plastic or the like.

It will be evident that the apparatus of this invention may be designed to accommodate any number of tubes. The particular apparatus shown has been designed to provide a means for casting inhibited propellant grains in a closed system and has proven to be highly successful in economically producing a large number of charges in a relatively short period of time. While the invention tends substantially simultaneously to load a plurality of tubes, in actual practice the tubes are usually loaded in any random sequence inasmuch as the completion of the filling of any one of the tubes will result in a propellant flow to the other tubes. Accordingly, simultaneous filling is a desirable but not a restrictive characteristic of this invention.

The method and apparatus herein disclosed are intended to be used in conjunction with the method and apparatus disclosed in co-pending U.S. patent applications Serial Nos. 3,472 and 8,190, now abandoned, filed in the names of the present inventors. Serial No. 3,472 describes a process and apparatus for preparing solid propellants and Serial No. 8,190 describes a method for delivering the solid propellants to mixers 34 of that application. The propellant is then delivered to the rocket loader of the present invention.

Other variations and modifications of the illustrative examples described and shown above are possible within the scope of the disclosure of the present invention. It will be understood that the mechanical construction of the apparatus may be changed or varied to suit different conditions of use, such modifications being within the scope of the method and apparatus of the present invention.

We claim:

1. A process of producing rocket motors of the type having a casing and a cured solid propellant therein with the use of structure attachable in cooperating relation with said casing having interiorly facing surface means positionable with respect to said casing to form substantially all of the exterior surface means of the cured propellant in said casing and having means defining an exterior chamber communicating with the interior of the casing by restricted port means, which process comprises the steps of attaching said structure in cooperating relation with said casing so as to provide a controllable space within said casing, said restricted port means and said chamber; evacuating said space; completely filling and confining a curable propellant mass within said space; curing the propellant mass confined within said space for a predetermined time period to form hardened propellant therein; and then removing said structure from said casing so as to sever the hardened propellant in said chamber at positions contiguous with said restricted port means so that the hardened propellant within said casing is provided with exterior surface means substantially conforming to the desired exterior surface means without the necessity of any substantial trimming operations.

2. A process as defined in claim 1 wherein the confining of said propellant mass within said space includes changing the confinement volume of the propellant mass within said chamber in response to changes in the volume of the propellant due to expansion and/or contraction thereof during curing while maintaining a substantially constant confinement pressure on the propellant mass within said chamber.

3. A process as defined in claim 2 wherein the filling of said propellant mass within said space is under pressure.

4. A process as defined in claim 3 wherein said substantially constant confinement pressure is substantially equal to the filling pressure of said propellant mass.

5. Apparatus for use in loading a curable propellant into rocket casings each having opening means therein and in curing the loaded propellant in the casings comprising loading and curing means fixedly attachable to a rocket casing and operable when so attached to direct a supply of uncured propellant into said rocket casing and to form substantially all of the exposed surfaces of the cured propellant within the casing during curing and detachable from the rocket casing after the curing of the propellant to form any remaining exposed surfaces of the cured propellant within the casing so as to eliminate the need for any substantial trimming of the cured propellant, said loading and curing means comprising structure including means defining a propellant receiving chamber having propellant inlet means communicating therewith arranged to be connected with a source of uncured propellant, means in said inlet means for permitting passage of uncured propellant from the source through said inlet means into said chamber and for preventing passage of propellant through said inlet means outwardly of said chamber, means defining propellant receiving surfaces positionable within the casing through the opening means thereof for forming the exposed surfaces of the propellant to be cured within the casing, restricted port means communicating the space bounded by said surfaces and the interior propellant receiving surface means of the casing with said chamber so that the propellant fed through said inlet means will fill both said space and said chamber, means defining an air exhaust outlet communicating with said space and arranged to be connected with a vacuum source so that said space can be deaerated prior to the filling of uncured propellant therein, and means acting between said air exhaust outlet and said space for permitting passage of air therethrough to said outlet and for preventing passage of propellant therethrough, said port means being of such size and shape that when said structure is detached from the casing the cured propellant in said port means and said chamber will be severed from the cured propellant in the casing along surfaces generally in alignment with said propellant receiving surfaces.

6. Apparatus as defined in claim 5 wherein said propellant receiving surfaces include a pair of spaced opposed end surfaces having circular outer peripheries.

7. Apparatus as defined in claim 6 wherein said propellant receiving surfaces include the exterior surface means of an elongated longitudinally tapered mandrel extending from the central portion of one of said end surfaces to the central portion of the other of said end surfaces.

8. Apparatus as defined in claim 7 wherein said structure includes a base section and a separate head section, one of said end surfaces being formed on each of said sections, said tapered mandrel having the large end thereof secured to one of said sections and means detachably securing the small end portion of said mandrel to the other of said sections to effect the attachment of said structure to the casing.

9. Apparatus as defined in claim 5 wherein said chamber defining means includes a wall movable in response to expansion and contraction of the propellant in said chamber during the curing of the same and means for exerting a substantially constant pressure on said wall.

10. Apparatus as defined in claim 9 wherein said wall comprises a piston and said chamber defining means also includes a cylinder member within which said piston is longitudinally reciprocably mounted.

11. Apparatus as defined in claim 10 wherein said means for exerting a substantially constant pressure on said wall comprises a constant pressure spring between said piston and cylinder member.

12. Apparatus as defined in claim 10 wherein said means for exerting a substantially constant pressure on said wall comprises an inert gas acting on said piston within said cylinder member.

13. Apparatus as defined in claim 10 wherein said means for exerting a substantially constant pressure on said wall comprises a resilient foamed material between said cylinder member and said piston.

14. Apparatus as defined in claim 5 wherein said means in said inlet means comprises a spring pressed ball.

15. Apparatus as defined in claim 5 wherein said port means includes a plurality of small apertures tapering outwardly from the associate propellant receiving surface.

16. Apparatus as defined in claim 5 including a base, means for detachably fixedly securing a plurality of said loading and curing structures to said base in a plurality of operative positions thereon, a main propellant supply conduit adapted to be connected with the source of supply of uncured propellant, and a plurality of branch conduits corresponding in number to the number of operative positions each having one end communicating with said main conduit and an opposite end communicating with the inlet means of a loading and curing structure fixedly secured in the associated operative position at a position downstream from the flow preventing means of the associated inlet means.

17. Apparatus as defined in claim 16 wherein said base includes a circular base plate and wherein each loading and curing structure includes a flanged housing part, the flanges of said housing parts being disposed in contact with said base plate in circumferentially spaced relation when said loading and curing structures are disposed in said operative positions, said means for detachably fixedly securing said loading and curing structures to said base comprising rotatable means secured centrally to said base plate for clamping said housing part flanges to said base plate and adjustable means secured to said base plate outwardly to said housings for clamping said housing part flanges to said base plate.

18. Apparatus as defined in claim 17 wherein said rotatable means comprises a spider having leg portions which slidably engage said housing part flanges when rotated.

19. Apparatus as defined in claim 18 wherein said rotatable means further includes means for limiting the extent of rotational movement of said spider.

20. Apparatus as defined in claim 17 wherein said adjustable means comprises a plurality of yokes slidably mounted on said base plate for engaging said housing part flanges.

21. Apparatus as defined in claim 20 wherein said adjustable means further includes means for limiting the sliding movement of said yokes.

22. Apparatus as defined in claim 5 wherein said loading and curing means includes a pair of separable members each having means for sealably receiving one of the ends of a plurality of rocket casings in the form of open ended tubes and means for securing said members together with the casings sealingly secured therebetween in parallel relation, said restricted port means comprising a plurality of ports formed in each member, said plurality of ports being of a number and disposed at positions to communicate interiorly with the adjacent open ends of said plurality of casings, said propellant receiving chamber being provided adjacent one of said members and communicating exteriorly with the ports associated therewith, said air exhaust outlet being provided adjacent the other of said members and communicating exteriorly with the ports associated therewith.

23. Apparatus as defined in claim 22 wherein said ports comprise restricted tapered openings diverging in a direction outwardly of the associated end of the associated casing.

24. Apparatus as defined in claim 22 wherein each of said members comprises a circular plate and wherein said chamber defining means comprises a peripheral wall extending from said one member having a cylindrical interior surface, and a piston mounted within said peripheral wall in sealing engagement with said cylindrical interior surface.

25. Apparatus as defined in claim 24 wherein said inlet means is formed in the central portion of said piston in axially extending relation, the chamber defining surface of said piston being generally frusto-conical in configuration.

26. Apparatus as defined in claim 25 wherein said means in said inlet means comprises a ball valve member and a spring acting between said ball valve member and the central portion of said one member.

27. Apparatus as defined in claim 22 wherein said means for securing said pair of members together comprises a rod secured to the central portion of said one member and extending therefrom toward the other of said members, the other of said members having an opening in the central portion thereof for receiving the outwardly extending end portion of said rod, and means acting between the outwardly extending end portion of said rod and said other member for moving said members toward each other and retaining them against movement in a direction away from each other, a rigid structure extending between said members for limiting the movement of said members toward each other but permitting their separation by movement away from each other.

28. Apparatus as defined in claim 27 wherein said means for securing said rod end portion and said other member together comprises a wedge member, said rod end portion having an opening therein for receiving said wedge member.

29. Apparatus as defined in claim 27 wherein said rigid structure includes a plurality of circumferentially spaced elongated rods and a plurality of longitudinally spaced plates carried by said plurality of rods having openings therein for receiving the casings and said first mentioned rod.

30. Apparatus as defined in claim 22 wherein said air exhaust outlet defining means includes a cylindrical chamber member of a size to be moved longitudinally over said members into an operative loading position and to be removed therefrom during curing, said chamber member having an open end arranged to sealingly engage said one member and a closed end arranged to be disposed in spaced relation to said other member when in said operative position.

31. A process as defined in claim 1 wherein the curing of the propellant mass is under heat and pressure.

References Cited by the Examiner

UNITED STATES PATENTS

| | | | |
|---|---|---|---|
| 2,435,610 | 2/1948 | Schneider | 86—20 |
| 2,668,986 | 2/1954 | Miler. | |
| 2,926,386 | 3/1960 | Hutchinson | 86—20 |
| 2,939,176 | 6/1960 | Adelman | 86—20 |
| 3,027,597 | 4/1962 | McCurdy | 264—3 |
| 3,077,636 | 2/1963 | Peters. | |

BENJAMIN A. BORCHELT, *Primary Examiner.*

R. V. LOTTMANN, *Assistant Examiner.*